United States Patent Office 3,561,300
Patented Feb. 9, 1971

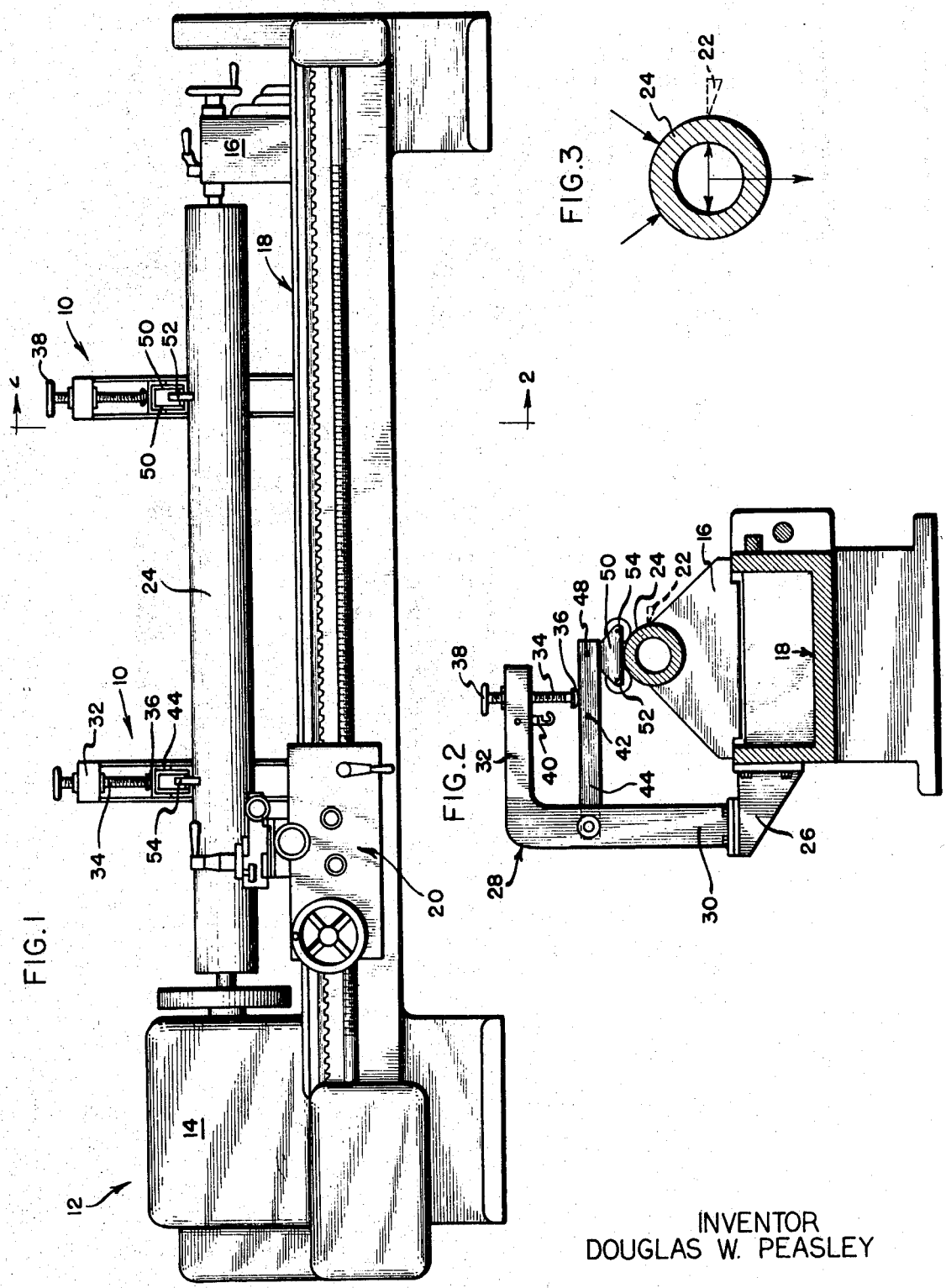

3,561,300
METHOD OF MACHINING AN ELONGATED SHAFT
Douglas W. Peasley, 3114 S. Austin Road, Cicero, Ill. 60650
Filed Mar. 19, 1968, Ser. No. 714,235
Int. Cl. B23b 3/00
U.S. Cl. 82—1                                           11 Claims

ABSTRACT OF THE DISCLOSURE

A method and apparatus are provided for steadying an elongated horizontally disposed rotating shaft against oscillatory movement during a turning operation. In the apparatus disclosed, downward pressure is applied at spaced points along the shaft through sets of rollers formed of a vibration-damping material.

---

The present invention relates generally to methods and apparatus employed in the machining of elongated shafts. More particularly, the invention relates to methods and apparatus for steadying elongated shafts during a turning operation.

In the precision machining or turning of elongated shafts, both tubular and solid, it is necessary that the shaft rotate as smoothly as possible about a longitudinal axis. Two problems which must be overcome in such a machining operation are the tendency of the shaft to whip and the tendency of the shaft to vibrate. Both movements, as well as any other movements tending to cause periodic deviation of the rotational axis from a stationary non-fluctuating condition, although not necessarily a straight line, will hereinafter be referred to as oscillatory movements. Whipping, which may be considered to be the tendency of the center of mass of the shaft to orbit about the intended rotational axis of the shaft, is common in shafts of significant length, e.g., 14 to 16 feet, where the sheer weight of the shaft causes it to bow or sag at the center when it is supported solely at its ends. As the shaft is rotated, the displacement of the center of mass from the intended rotational axis is accentuated by centrifugal forces.

Vibrations within a rotating shaft can be accentuated by the forces applied to the shaft by the cutting tool and can also be accentuated by vibrations occurring within the immediate environment or within other portions of the lathe and transmitted to the shaft.

There have been two general approaches to the problem of whipping and vibration and other oscillatory movements. A generally accepted approach is the provision of a device known either as a "steady rest" or as a "roller rest." This device is fixed to the bed of the lathe and includes three or four metallic rollers equally spaced around the periphery of the shaft and in engagement therewith. The rollers are supported for rotation about axes maintained as stationary as possible relative to the shaft so that, ideally, the shaft will be completely contained and can rotate only about a stationary axis.

The steady rest approach, although widely used, is not completely satisfactory. In order for the rollers to be supported rigidly enough and in precise relation to each other, it has been considered necessary to mount them adjacent the inner surface of a solid ring which encircles the shaft. This makes it impossible to machine the shaft from one end to the other in a single pass. Thus, it has been necessary to first mount the shaft in the lathe and then while rotating the shaft at a relatively slow speed, machine a narrow band at a location slightly to one side of the longitudinal mid-point of the shaft. The steady rest is then mounted on the lathe bed in encircling relation to the machined band with the rollers of the steady rest in engagement with the band. The shaft is machined at a somewhat higher speed from one end past the mid-point and up to the steady rest. To complete the machining operation, that is, to machine the remaining half of the shaft, the shaft is removed from the lathe, reversed end for end, and re-mounted in the lathe with the recently machined portion of the shaft disposed within the steady rest. The remainder of the shaft is then machined.

A serious disadvantage in the use of the conventional steady rest is the time delay caused by the necessity of halting the operation after machining only one-half the shaft, removing the shaft from the lathe, reversing it end for end, and again re-mounting it in the lathe for the machining of the remaining one-half. A second serious limitation is the fact that when the machining operation is interrupted and the shaft reversed end for end, the axis of rotation of the half first machined is not co-linear with the axis of rotation of the second half, due possibly to changes which take place within the shaft itself as stresses are relieved by the machining operation. Frequently, therefore, it is necessary to again reverse the shaft end for end and make a third and then a fourth pass.

Moreover, the use of a steady rest does not eliminate vibrations completely and, accordingly, the shaft must be rotated at a relatively low speed during the machining operation to prevent vibrations from reaching an intolerable level. Finally, the use of a single steady rest necessarily leaves at least one-half of the shaft unsupported, even though the over-all length of the shaft being turned may be quite large. As the over-all length increases, the vibration problem becomes more serious and the tendency for whipping to re-occur becomes more likely. However, the use of more than one steady rest compounds the problems and delays necessitated by reversing the shaft end for end. The use of more than one steady rest is therefore impractical. Hence, as the overall length of the shaft increases, the practical speed of rotation decreases.

A second approach to the problem of whipping and vibration is the use of a so-called "follower rest," a device which is similar in design to the steady rest but is mounted on the tool holder carriage and moves therewith along the shaft. In theory, the follower rest steadies the shaft at the area in which the working occurs while the remainder of the shaft is free to whip or vibrate as the case may be. While the use of a follower rest permits a continuous pass along the length of the shaft without reversing the shaft end for end, as with the steady rest, it does not eliminate the whipping and vibration, making relatively low speeds of rotation and several cuts and finishing cuts necessary.

Accordingly, it is a principal object of the present invention to provide an improved method and apparatus for machining an elongated shaft.

Another object of the invention is to provide an improved method and apparatus for steadying an elongated shaft during a machining operation.

Other objects and advantages of the invention will become apparent with reference to the following description and the accompanying drawing.

In the drawing:

FIG. 1 is an elevational view of a lathe incorporating a device showing various of the features of the invention;

FIG. 2 is a sectional end view taken along line 2—2 of FIG. 1; and

FIG. 3 is a diagrammatic view showing the application of forces to the shaft on the lathe shown in FIG. 1.

A pair of the apparatus 10 showing various of the features of the present invention is illustrated in the drawing. However, although two such apparatus are illustrated, only one will be described in detail, it being understood that the other is identical in construction to it.

The illustrated apparatus, which shows various of the structural features of the invention, is also adapted to be employed in the practice of the method of the invention. Modified forms of the illustrated apparatus also fall within the scope of the invention, and can also be employed in the practice of variations in the method of the invention.

The apparatus 10 is shown as mounted on a standard or conventional lathe 12 having a head stock 14, a tail stock 16, and a bed 18. A carriage 20 is movable along the bed and carries a cutting or machining tool 22, represented diagrammatically in FIGS. 2 and 3. Supported between the head stock 14 and the tail stock 16 is a work piece in the form of an elongated shaft 24 which may be a hollow tubular shaft, as illustrated in FIG. 2, or a solid shaft. It will be assumed that the shaft is long enough to present a problem of whipping and/or vibrating, i.e., oscillatory movements, when it is rotated at a desired operational speed. The problems of oscillatory movement might also be expected in a solid shaft of similar diameter and somewhat greater length, or in either a hollow or solid shaft of similar length but a significantly lesser diameter.

The apparatus 10 (FIG. 2) includes a bracket 26 which is suitably bolted to the rear of the lathe bed 18, i.e., that portion of the lathe bed opposite the carriage 20. Preferably, the lathe bed is provided with a plurality of accommodating sets of holes along its length so that the bracket can be mounted at various locations depending upon the length of the shaft being turned, as discussed in further detail herein. Other mounting means, such as a rail to which the bracket is clamped, could of course also be employed without departing from the scope of the invention. Conceivably, the bracket, or its equivalent, could also be mounted on the floor or wall, adjacent the lathe.

The bracket 26 defines a horizontal upwardly facing plateau on which is mounted a support 28, both the bracket and support being of heavy stock to enable them to withstand considerable force without significant deformation. The support is a single integrated unit and includes a post 30 and an arm 32 which extends at generally right angles to the post. The free end of the post, which in fact is the lower end, is flanged to facilitate attachment thereof to the plateau of the bracket. When suitably mounted on the bracket by means of bolts or the like, the post extends generally vertically upwardly behind the shaft being turned and the arm 32 extends forwardly above and in partially overhanging relation to the shaft. A threaded opening extends vertically through the arm 32 above the axis of rotation of the shaft and receives a pressure screw 34 provided with a pressure button 36 at its lower end and with a handle 38 at its upper end. A hook 40 is pivotally mounted on one side of the arm to engage a pin 42 on a lever 44, as hereinafter described.

The lever 44 is mounted on the post 30 for pivotable movement about a horizontally disposed axis. The lever extends forwardly from the post 30 beneath the arm 32 above and in overhanging relation to the axis of rotation of the shaft and includes a flat upper surface engageable by the button 36 of the pressure screw 34. The pin 42 projects laterally from a side of the lever and is engaged by the hook when the lever is lifted a sufficient degree, thereby making it possible to maintain the lever in an out-of-the-way position for mounting and dismounting of a workpiece.

Pivotally mounted adjacent the upper end of the lever 44 by means of a pin 48 is a pair of generally triangular plates 50, the pin passing through one of the apexes of each of the plates. A roller 52 is rotatably mounted adjacent each of the remaining two apexes of the plates by means of roller shafts 54. Because of the orientation of the plates, the axes of rotation of the rollers are therefore located beneath the lever 44. Each roller is formed to provide an outer peripheral portion of a vibration damping material such as natural or synthetic rubber. In a preferred embodiment, the rollers are formed of a material sold under the trademark neoprene, are two inches in width at their periphery, and have a durometer hardness of between 90 and 100. In addition to the vibration-damping feature, a material such as neoprene does not mark the shaft at the area of engagement as do the metal rolls of the conventional roller rest. This feature is particularly important where the finish of the shaft is critical.

In the use of the apparatus 10, the shaft 24 is mounted in the lathe in the usual manner. During the mounting, the lever 44 is maintained in an out-of-the-way position by the hook 40 and pin 42. With the shaft in place, the hook 40 is disengaged so that the rollers 52 rest upon the upper surface of the shaft. The screw 34 is then rotated by means of the handle 38 to force the lever 44 downwardly and, in so doing, to force the rollers 52 into pressure engagement with the shaft. While the amount of force applied may vary depending upon the size of the shaft, in a preferred embodiment the force exerted by the two rollers of each apparatus 10 is approximately 400 pounds. This force could of course also be created by an hydraulic system if desired.

In the illustrated embodiment, two apparatus 10 are illustrated for a single shaft 24. In one practice of the invention, where a stainless steel tube with a 12-inch outer diameter and a length of 16 feet is being turned, it is helpful to employ two of the apparatus, one being located approximately 5 feet from one end of the shaft and the other being located approximately 5 feet from the opposite end, thus dividing the shaft into three sections, each having a length equal to approximately one-third the over-all length of the shaft. For shorter shafts, a single apparatus may be adequate, while for longer shafts even a greater number of apparatus 10 may be advisable. The precise location of the apparatus is not believed critical except that, insofar as vibrations of the shaft are concerned, it is preferable for the apparatus to be located at a point where the center of vibrational loops or anti nodes occur rather than at points where nodes occur. Thus, for example, if a single apparatus is used, it is preferable that it not be located at the midpoint of the shaft.

It has been found that the use of the present apparatus in place of a conventional steady rest appreciably shortens the time required to turn the shaft. For example, a hollow shaft 14 feet in length and 12 inches in outer diameter formerly required 5½ hours to turn; through the use of the present method and apparatus, an identical shaft can be turned in 1½ hours. It is not known precisely which of the features of the invention are the most significant or whether, in fact, all the features contribute significantly. The apparatus 10, of course, makes it possible to turn the shaft from one end to the other without interruption. Thus, it is not necessary to halt the operation and reverse the shaft end for end. This alone results in a considerable savings of time.

The working of the shaft end to end without interruption is made possible by the fact that the apparatus 10 is capable of supporting the shaft without the use of a continuous ring which encircles the shaft, as in the conventional steady rest. That is, the cutting tool can actually operate upon the area being engaged by the rollers of the apparatus 10 without moving the apparatus or altering it in any way except perhaps to turn down the pressure screw slightly after the area engaged by the rollers has been machined. This slight additional rotation of the pressure screw would compensate for the slight amount of material removed. However, even this has not been found to be necessary.

The ability of the apparatus 10 to maintain the shaft in place, i.e., to cause the shaft to rotate about a relatively fixed axis, is believed due at least in part to the fact that the vertical components of the forces applied through the rollers deflect the shaft downwardly and that this deflection is maintained throughout the turning operation since the rollers are not allowed to return to a non-deflecting position. Insofar as displacement in a vertical plane caused by oscillations of the shaft is concerned, the shaft can only be displaced downwardly a distance equal to the difference between one half the normal oscillatory displacement and the deflection induced by the rollers. That is, if the normal vertical oscillatory displacement is 10 mm. (5 mm. above the average axis and 5 mm. below), and the deflection caused by the rollers is 4 mm., the greatest possible oscillatory displacement is 1 mm. If, however, the deflection caused by the rollers exceeds one-half the normal oscillatory displacement, i.e., 5 mm., there will be no vertical oscillatory displacement. Horizontal oscillatory displacement is, on the other hand, minimized by the counteracting lateral components of the forces exerted by the rollers. In FIG. 3, a simplified force diagram is shown. It will be noted that there is a lateral component of the forces exerted by the two rollers in each of two opposite horizontal directions. If each of these components exceeds the force tending to displace the shaft in a direction opposite to it, there will be no lateral displacement and the shaft will be effectively contained for rotation about a stationary axis. Stated another way, if the forces maintaining the shaft against lateral displacement exceed the forces tending to cause such displacement, lateral or horizontal displacement will not occur.

Thus, the vertical components of the forces applied by the rollers cause a vertical deflection which prevents vertical displacement. The horizontal components of these forces do not cause deflection but contain the shaft and prevent lateral displacement.

In the illustrated embodiment the two rollers of each apparatus 10 are circumferentially spaced from each other around the shaft on opposite sides of a vertical plane containing the axis of rotation of the shaft and are equidistant from that plane above the axis. This arrangement is believed preferable since the downward deflection is in the direction of the gravitational forces and, furthermore, does not interfere with the action of the cutting tool when the cutting tool is located at a point approximately at the horizontal level of the axis. It would not be desirable, of course, to deflect the shaft in a direction toward or away from the cutting tool since this would result in a shaft which would either be highly concave or highly crowned at its center. It is conceivable that the shaft could be deflected upwardly by placing the rollers beneath the shaft and applying an upward force. However, this is thought to be less desirable since the chips cut from the shaft would tend to enter the nip between the shaft and roller. This would soon damage relatively soft rollers and, in some instances, might also damage the surface of the shaft.

As has been pointed out, the triangular plate 50 is pivotably connected to the lever 44 above the axis of rotation of the shaft. This permits the rollers to adjust slightly if, for example, the true center of rotation is located slightly laterally of a point directly beneath the pin 48. In such an instance, the plate 50 can pivot slightly in one direction to assure uniform application of pressure.

The use of composition rollers is believed helpful in minimizing vibrations. In a preferred embodiment, rollers having a durometer hardness of between 90 and 100 have been found to be satisfactory and are believed to damp vibrations within the shaft. Such damping rollers could not conveniently be employed with conventional steady rests or roller rests since in neither device is pressure applied to the shaft by the rollers; rather, the rollers merely contain the shaft. Deformable rollers, not under pressure, would not be capable of effectively containing the shaft, but would give or deform in response to vibrations.

It also helps to employ more than one steadying device in the turning of the shaft since this shortens the effective length of the shaft being turned. The use of two or more apparatus 10 is therefore believed to contribute to the success of the invention. Previously, it was not practical to use more than one conventional steady rest because of the inconvenience of reversing the shaft end for end. Ideally, a sufficient number of apparatus 10 are employed so as to divide the shaft into sections, none of which is sufficiently long to cause the section to vibrate at its resonant frequency at the desired rotational operational speeds of the shaft.

An improved method and apparatus have thus been described which permit rapid, more efficient turning of a shaft with minimal vibrations and whipping but without loss of accuracy within the desired tolerances.

While one specific structural embodiment of an apparatus formed in accordance with the present invention for practicing one form of method falling within the scope of the invention has been shown and described, it should be apparent that various modifications may be made in the apparatus and in the method of the invention without departing from the scope thereof.

Various of the features of the invention believed to be novel are set forth in the following claims.

What is claimed is:

1. A method of machining an elongated shaft having a tendency to oscillate during the machining operations, which method comprises:
    (A) supporting the shaft adjacent its opposite ends for rotation about its longitudinal axis,
    (B) effecting rotation of said shaft about said axis,
    (C) deflecting the shaft in a plane of potential oscillatory movement,
    (D) and effecting engagement between a machining tool and the shaft progressively along a given line while exerting a force on the machining tool in a given direction and while maintaining said deflection of said shaft,
        (1) the line of engagement between the machining tool and shaft being generally parallel to the plane of deflection and lying in a plane parallel and in close proximity to a plane normal to the plane of deflection and containing the axis of rotation of the shaft,
        (2) the direction of the force exerted on the machining tool being generally normal to the plane of deflection.

2. A method in accordance with claim 1, wherein a section of the shaft is deflected to at least as great an extent as one-half the total displacement of the section which the force causing the oscillation would otherwise be capable of effecting in the plane of deflection.

3. A method in accordance with claim 1, wherein the deflection is maintained by engaging the deflected shaft with means capable of resisting movement by oscillation-inducing forces tending to displace the shaft in a direction opposite to said direction of deflection.

4. A method in accordance with claim 1, wherein the shaft is further restrained by engagement thereof by means capable of resisting movement by oscillation-inducing forces tending to displace the shaft in each of two opposite directions normal to said direction of deflection.

5. A method in accordance with claim 1, wherein deflection is accomplished and maintained by engaging the shaft with a pair of rollers at points spaced from each other circumferentially around the shaft a distance no greater than one-fourth the circumference of the shaft at the area of engagement, and applying a force to each of the rollers urging it in the direction of the axis of rotation of the shaft.

6. A method in accordance with claim 5, wherein the rollers engage the shaft above the axis of rotation thereof on opposite sides of a vertical plane containing the axis of rotation and in equally spaced relation to said plane.

7. A method in accordance with claim 1, wherein deflecting forces are applied at each of two points spaced along the shaft, one of said points being located approximately midway between the longitudinal center of the shaft and one end and the other point being located approximately midway between the longitudinal center of the shaft and the opposite end.

8. A method in accordance with claim 1, wherein a deflecting force is applied to a sufficient number of points along the shaft so that the maximum distance between any point and the adjacent end of said shaft or any point and an adjacent point is less than the minimum length of shaft capable of vibrating at its resonant frequency at the desired operational speed of rotation of the shaft.

9. A method of steadying an elongated horizontally disposed rotating shaft against oscillatory movement during a turning operation, which method comprises placing a pair of rollers in engagement with said shaft, each of said rollers engaging said shaft at a point above the axis of rotation of said shaft, the points of engagement of said shaft by said rollers being located on opposite sides of a vertical plane containing the axis of rotation of the shaft and being equally spaced therefrom, exerting a force on said shaft uniformly through said rollers effective to deflect the shaft, and maintaining the rollers in the position causing said deflection.

10. A method in accordance with claim 9, wherein said rollers are formed of a vibration-damping material.

11. A method in accordance with claim 9, wherein said points of engagement of said rollers are spaced circumferentially from each approximately 45°.

References Cited

UNITED STATES PATENTS 1,338,178    4/1920    Henderson     82—1(.4)
2,851,916    9/1958    Grandy et al.     82—1(.4)

LEONIDAS VLACHOS, Primary Examiner

U.S. Cl. X.R.

82—38